US012153384B2

(12) United States Patent
Bachmann

(10) Patent No.: US 12,153,384 B2
(45) Date of Patent: Nov. 26, 2024

(54) TIMEPIECE DISPLAY DEVICE ON SEVERAL WHEELS

(71) Applicant: ETA SA Manufacture Horlogère Swiss, Grenchen (CH)

(72) Inventor: Stéphane Bachmann, Büren an der Aare (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 382 days.

(21) Appl. No.: 17/683,971

(22) Filed: Mar. 1, 2022

(65) Prior Publication Data

US 2022/0291631 A1 Sep. 15, 2022

(30) Foreign Application Priority Data

Mar. 9, 2021 (EP) .................................... 21161610

(51) Int. Cl.
*G04B 9/00* (2006.01)
*G04B 19/02* (2006.01)

(52) U.S. Cl.
CPC ............. *G04B 9/005* (2013.01); *G04B 19/02* (2013.01)

(58) Field of Classification Search
CPC ...... G04B 9/005; G04B 19/02; G04B 13/007; G04B 3/12; G04B 5/007; G04B 19/2532; G04B 19/2536
See application file for complete search history.

(56) References Cited

U.S. PATENT DOCUMENTS

| | | | | |
|---|---|---|---|---|
| 5,828,628 A * | 10/1998 | Born | G04B 9/005 368/203 |
| 9,367,040 B2 * | 6/2016 | Reynard | G04B 19/21 |
| 9,971,311 B2 * | 5/2018 | Friedli | G04B 13/008 |
| 2011/0058455 A1 | 3/2011 | Watanabe | |

FOREIGN PATENT DOCUMENTS

| | | |
|---|---|---|
| CH | 688 874 A5 | 4/1998 |
| CN | 101281386 A | 1/2008 |
| CN | 102163037 A | 8/2011 |
| EP | 1 612 625 B1 | 1/2006 |
| EP | 1 970 778 A1 | 9/2008 |
| EP | 2 360 535 A1 | 8/2011 |
| JP | 2018-100970 A | 6/2018 |
| KR | 10-2018-0002697 A | 1/2018 |

OTHER PUBLICATIONS

European Search Report for EP 21 16 1610 dated Aug. 6, 2021.

* cited by examiner

*Primary Examiner* — Edwin A. Leon
(74) *Attorney, Agent, or Firm* — Sughrue Mion, PLLC

(57) ABSTRACT

A timepiece including a timepiece mechanism (200) and a display device (100) for displaying a magnitude relating to the timepiece mechanism (200), in combination on wheels (1 2) driven by rotational movements in the same direction of rotation by at least one output (3; 4) of the timepiece mechanism (200), at least one wheel (1; 2) being integral in rotation with an indicator (60) to display a representation of this magnitude by the angular difference between the wheels (1; 2) or between a wheel (1; 2) and a fixed scale, the timepiece mechanism (200) driving, at a given time, a single wheel (1; 2) by a single output (3; 4), the display device (100) driving one of the wheels (1; 2) by another, and the display device and/or the timepiece mechanism can disengage in at least one end-of-travel position of a wheel (1; 2).

20 Claims, 9 Drawing Sheets

TIMEPIECE DISPLAY DEVICE ON SEVERAL WHEELS

CROSS REFERENCE TO RELATED APPLICATIONS

This application is an Utility application, claiming priority based on European Patent Application No. 21161610.7 filed Mar. 9, 2021.

TECHNICAL FIELD OF THE INVENTION

The invention relates to a timepiece, in particular a watch, which includes a timepiece mechanism, and a display device for displaying at least one magnitude relating to this timepiece mechanism, this display is produced in combination on a plurality of wheels which are arranged to be driven in rotational movements in the same direction of rotation by at least one output included in this timepiece mechanism, at least one such wheel being integral in rotation with an indicator so as to display a representation of the magnitude by the angular difference between the indicators or between such an indicator and a fixed scale.

The invention relates to the field of display mechanisms for timepieces, in particular for complication timepieces.

TECHNOLOGICAL BACKGROUND

Displaying the power reserve is a useful complication in the field of mechanical movement watches driven by at least one energy source such as a spring barrel, or the like.

In the display of a conventional power reserve, in general a differential allows to collect charging and discharging information from the barrel, and to transcribe them through an indicator, often consisting of a hand integral with a wheel driven by this differential. Consequently, the display or the power reserve display hand, which moves in front of a graduated or imaged reference scale, rotates in the clockwise or counter clockwise direction depending on the gain (winding of the watch) or loss (rate of the watch) of power reserve.

The maximum and minimum power reserve indications can be read on the reference scale, generally dependent on a dial, itself fixed and integral with the platen. When reaching one of these extreme positions, a mechanism such as a friction (which can be incorporated in the differential), absorbs the rotations of the geartrain relative to the hand in a fixed position on the maximum or minimum stop as appropriate. The power reserve hand, controlled by the differential, displays the level of instantaneous power reserve between the two extreme marks of maximum or minimum power reserve.

The differential mechanism is a proven, precise and reliable solution; however, this mechanism is bulky, in particular depending on the thickness of the watch, sensitive to shocks, and expensive. Any simplification alternative is therefore welcome.

SUMMARY OF THE INVENTION

The invention proposes to create a particular timepiece mechanism, in particular for a watch, including a display mechanism for the display of particular magnitudes not necessarily related to the time measured by the horological movement, and in particular for displaying the power reserve of a mechanical watch.

The mechanism according to the invention overcomes the presence of a differential, and simplifies the geartrain. It is, again, designed to simplify its assembly on the movement of the watch.

To this end, the invention relates to a timepiece according to claim 1.

BRIEF DESCRIPTION OF THE FIGURES

The purposes, advantages and features of the invention will appear upon reading the detailed description which follows, with reference to the appended figures illustrating non-limiting variants of the invention:

FIG. 4 shows, schematically and in plan, a first outer wheel, internally receiving a second wheel, each of them including a radial projection intended to interfere with the trajectory of the other wheel, each projection including two stop surfaces on either side;

FIG. 5 shows, schematically and in plan, a first outer wheel, which includes a housing for internally receiving the second wheel, this housing is interrupted by a radial inner projection intended to interfere with the trajectory of the second wheel, this inner projection includes two stop surfaces on either side;

FIG. 6 shows, schematically and in plan, a second inner wheel, which includes an outer area substantially of revolution capable of cooperating with the housing of the first wheel, this area is interrupted by a radial outer projection intended to interfere with the trajectory of the first wheel, this outer projection has two stop surfaces on either side;

FIG. 9 illustrates the presentation of this removable sub-assembly from above the movement which is provided with a conventional control rod;

FIG. 10 shows the removable sub-assembly positioned in the movement and immobilised by keys and locks which are all operable from above the watch;

DETAILED DESCRIPTION OF THE INVENTION

Figure 1:
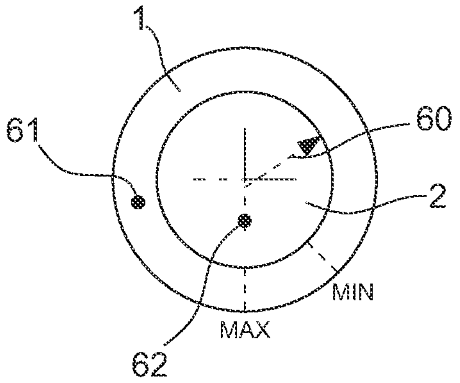
FIG. 1 shows, schematically and in front view, two concentric wheels arranged for a display according to the invention, in the application to the display of the power reserve of a mechanical watch.
Figure 2:
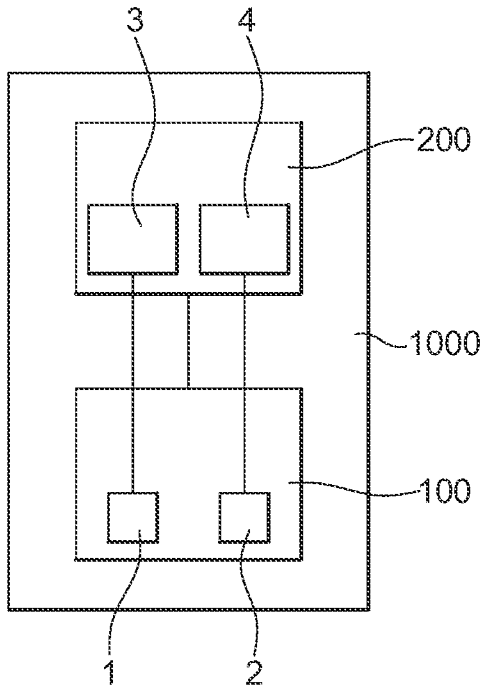
FIG. 2 is a block diagram representing a timepiece according to the invention, in particular a watch, including on the one hand a timepiece mechanism such as a movement including at least two outputs, each capable of cooperating with such a wheel included in a display device.
Figure 3:
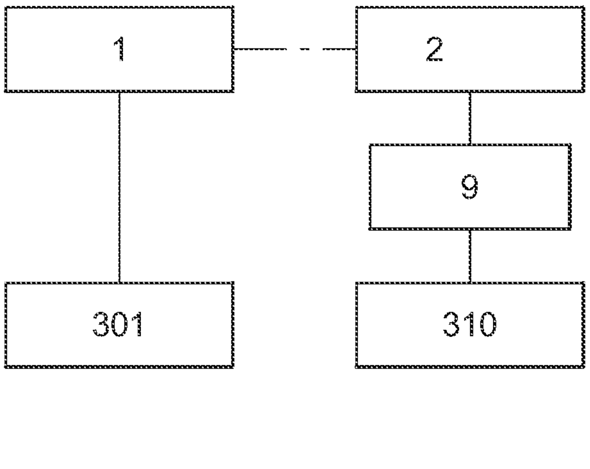
FIG. 3 is a block diagram representing the application to the display of the power reserve of a mechanical watch, where the timepiece mechanism includes a load geartrain, which is driven by a coiling shaft included in a barrel or a set of barrels; this load geartrain drives a coiling indicator constituting one of the wheels; the timepiece mechanism includes an unload geartrain, which is driven by a cover or a drum included in the barrel which is directly upstream of the display mechanism, and this unload geartrain drives an uncoiling indicator constituting another of the wheels. Friction means are here inserted between the cover or drum and the uncoiling indicator.

The invention relates to a timepiece 1000, in particular a watch, which includes a timepiece mechanism 200, and a display device 100 for displaying at least one magnitude relating to this timepiece mechanism 200. This timepiece mechanism may include or be a movement, a chronograph mechanism, or the like.

This display is produced in combination on a plurality of wheels 1, 2, which are arranged to be driven by rotational movements in the same direction of rotation by at least one output 3, 4, included in this timepiece mechanism 200, at least one such wheel 1, 2, being integral in rotation with an indicator 60, 61, 62, so as to display a representation of the magnitude by the angular difference between the indicators 60, 61, 62, or between such an indicator 60, 61, 62, and a fixed scale.

According to the invention, the timepiece mechanism 200 is arranged to drive, at a given time, only one of the wheels 1, 2, by a single output 3, 4. And the display device 100 includes internal means for driving such a wheel 1, 2, by another wheel 2, 1. And the display device 100 and/or the timepiece mechanism 200 includes means for disengagement in at least one end-of-travel position of a wheel 1, 2.

More particularly, the timepiece mechanism 200 includes means for disengagement in each end-of-travel position of such a wheel 1, 2.

More particularly, the internal drive means are formed by stop surfaces 5, 6, of a wheel 1, 2, which are arranged to cooperate with complementary stop surfaces 7, 8, included in another mobile 2, 1.

More particularly, the disengagement means include friction means 9 incorporated in a control geartrain 201, 202, included in the timepiece mechanism 200. For example, these friction means 9 include at least one cup spring or the like.

More particularly, and as seen in the version illustrated by the figures, two wheels 1 and 2 are coaxial. More particularly still, in a particular variant where the timepiece mechanism 200 includes a movement with a main output axis which is that of at least one of the displays of the timepiece 1000, the wheels 1, 2, are coaxial to this main axis. In other variants, their common axis is eccentric relative to this main axis, to which this common axis preferably remains parallel.

More particularly, the mechanism 200 is arranged to drive each wheel 1, 2, substantially at the same angular speed.

More particularly, at least one of the wheels 1, 2, is a ring surrounding the other of the wheels 2, 1, which is a ring or a disc.

Figure 4:
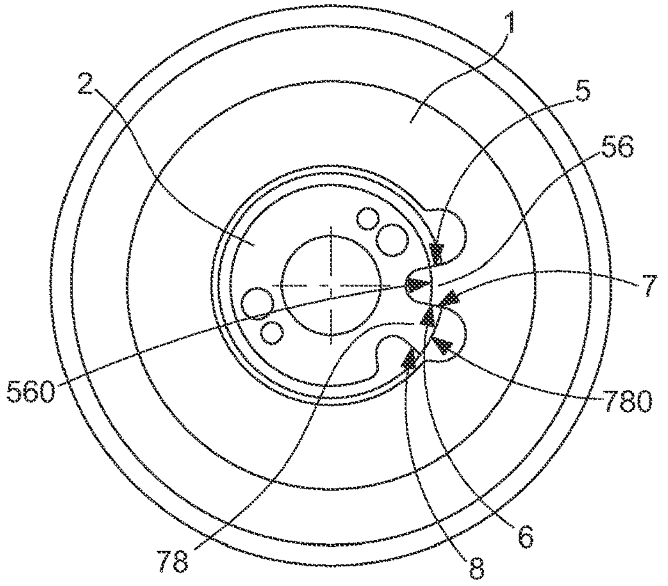
FIGS. 4 to 6 illustrate the drive cooperation of the two wheels one by the other.
Figure 5:
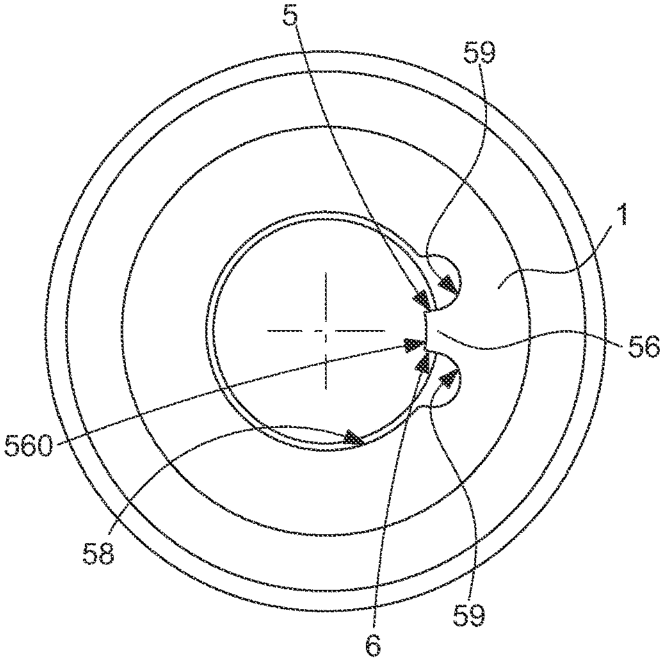
Figure 6:
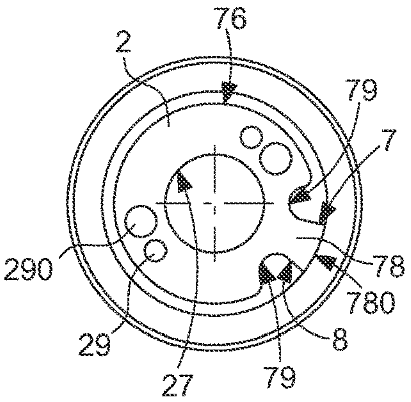

More particularly, and as seen in FIGS. 4 to 6, a first wheel 1 is an outer ring which includes, on the inside, an inner area of revolution 58, which is interrupted by an inner projection 56 including at least a first lateral stop surface 5, 6; this inner projection 56 includes an inner radial end 560 which is closer to the common axis than the inner area of revolution 58. More particularly, the inner projection 56 is bordered, beyond the first lateral stop surfaces 5, 6, by first recesses 59.

And a second wheel 2 is an inner ring or a disc which includes, on the outside, an outer area of revolution 76, which is interrupted by an outer projection 78 including at least a second lateral stop surface 7, 8; this outer projection 78 which includes an outer radial end 780 farther from the common axis than the outer area of revolution 76 and than the inner radial end 560, to allow relative drive between the inner projection 56 and the outer projection 78 by abutting with each other. More particularly, the outer radial end 780 fits within a smaller diameter than that of the inner area of revolution 58, and the inner radial end 560 extends radially beyond a diameter equal to that of the outer area of revolution 76. More particularly, the outer projection 78 is bordered, beyond the second lateral stop surfaces 7, 8, by second recesses 79.

More particularly, the second wheel 2 is an inner ring, which is arranged to carry a central dial 26 indexed by feet 28, 280; more particularly, these feet are asymmetrical to ensure foolproofing during assembly, and the correct positioning of the reference elements.

More particularly, at least one of the wheels 1, 2 carries an indicator 60, such as a hand, a mark, or the like, which is movable facing a scale defining a minimum magnitude MIN and a maximum magnitude MAX; this scale is carried by another wheel, respectively 2, 1, or by a platen 40 or a holding plate 50 included in the timepiece mechanism 200.

More particularly, the display device 100 is a power reserve display device for displaying the energy level of an energy source including a barrel 30 or a set of barrels 30 mounted in series and included in the timepiece mechanism 200. This timepiece mechanism 200 includes a load geartrain 201, which is driven by a coiling shaft 301 included in the barrel 30 or the set of barrels 30; this load geartrain 201 drives a coiling indicator 1 forming one of the wheels 1, 2.

Figure 7:
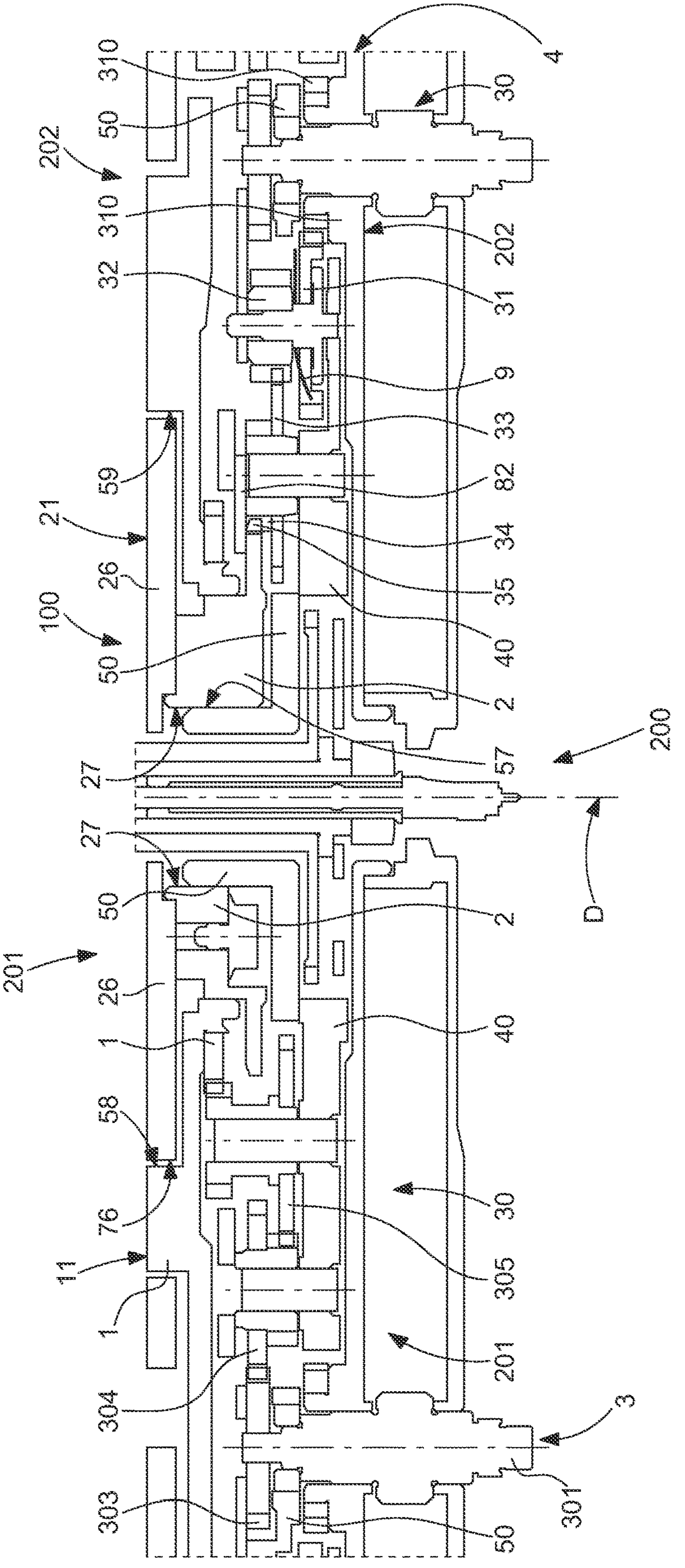
FIG. 7 shows, schematically, partially, and in section passing through an axis common to the two wheels, a watch, including a movement with a platen surmounted by a holding plate; the movement includes at least one barrel, and includes a load geartrain driven by a coiling shaft of a barrel; this load geartrain drives a coiling indicator. The movement includes an unload geartrain driven by a cover or a drum included in the barrel closest to the display mechanism, and this unload geartrain drives an uncoiling indicator, through a friction connection; the first wheel is surrounded by an outer dial; the second wheel, centred around the cannon-pinion, carries a central dial.
Figure 8:
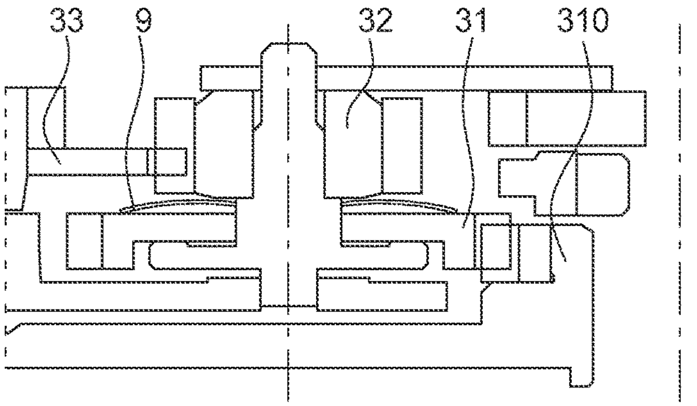
FIG. 8 is a detail of the friction of FIG. 7.
Figure 9:
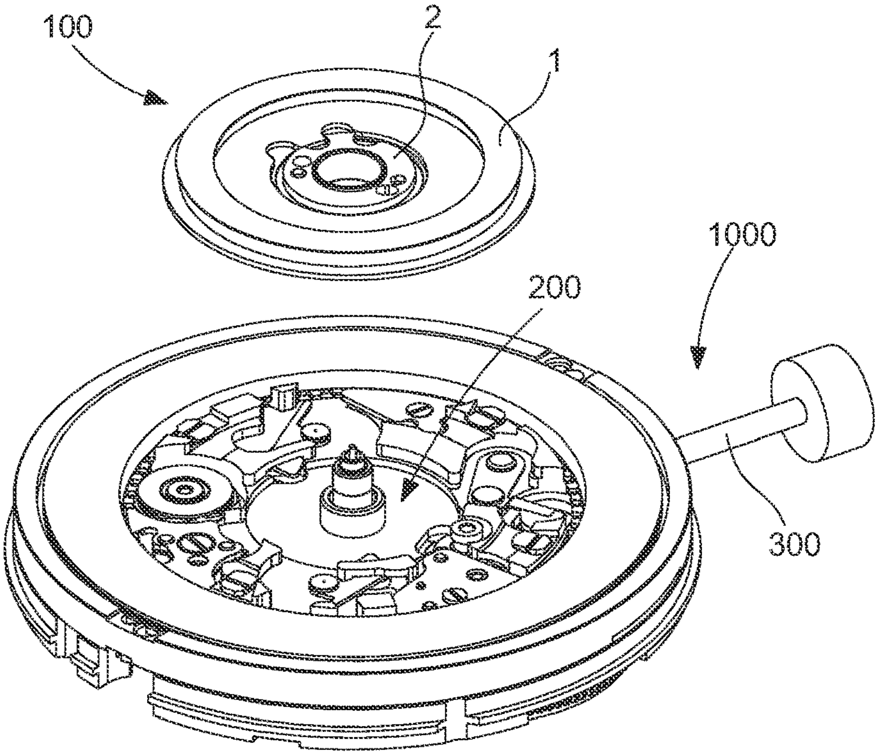
FIGS. 9 and 10 show, schematically and in perspective, a removable sub-assembly which includes at least the first and the second wheel.
Figure 10:
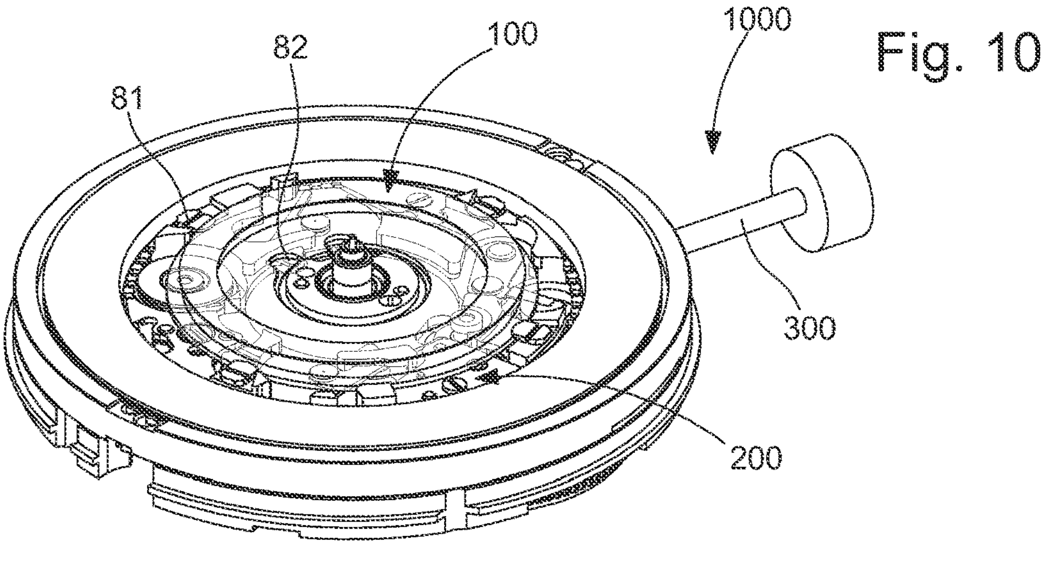

In a particular non-limiting embodiment, the load geartrain 201 includes, carried by the coiling shaft 301 which is guided in a holding plate 50, a drive intermediate wheel 303, which meshes with a first reduction wheel 304, which meshes with a second reduction wheel 305 which drives the first wheel 1, in particular a coiling power reserve indicator in the application illustrated by FIG. 7.

The timepiece mechanism 200 includes an unload geartrain 202, which is driven by a cover 310 or a drum included in the barrel 30 directly upstream of the display mechanism 100, and this unload geartrain 202 drives an uncoiling indicator 2 constituting another of the wheels 2, 1. In a particular non-limiting embodiment, the unload geartrain 202 includes a barrel cover 310, which meshes with a primary wheel 31 included in an intermediate friction wheel, composed of this primary wheel 31 and a secondary wheel 32 which can be coupled by means of a friction 9, in particular of at least one spring or the like; the secondary wheel 32 meshes with a third reduction wheel 33, which drives the second wheel 2 in particular an uncoiling power reserve indicator in the application illustrated by FIG. 7.

More particularly, the friction means 9 are inserted between the coiling shaft 301 and the coiling indicator 1, or/and between the cover 310 or drum and the uncoiling indicator 2.

The figures illustrate a particular, non-limiting variant, where the display mechanism 100 provides a power reserve indication located in the centre of the timepiece. In short, the invention allows to display the power reserve using two concentric discs, one rotating only when loading the barrel, the other only when unloading. The two wheels, which here are rings, rotate in the same direction, which is the clockwise direction in the variant illustrated.

The cooperation of the stop surfaces on each side of the minimum and maximum extremes, of the power reserve allows, using the friction means 9, on the one hand to simultaneously rotate the discs when the power reserve is maximum and if the user continues to control the coiling, either by action on a control rod, or by movements of the wrist in the case of an automatic winding mechanism with an oscillating weight, and on the other hand the discs to remain stationary when the power reserve device displays a zero value. The combination of the two allows to display the remaining power reserve level. It is understood that a first combination of mechanical stops, when one of the wheels catches up with the other, thus allows, during a complete and forced load of the movement (the user continues to rotate the rod or to move the oscillating weight, despite a barrel already fully loaded), to simultaneously drive the two wheels in rotation (the first driving the second using the stop); the presence of a friction means 9 in the geartrain allows disengagement and avoids any breakage.

The second combination of mechanical stops, when the second wheel catches up with the first wheel, freezes the wheels in position when they display the value zero. If, despite the display of zero information, the movement still has a few hours of power reserve, and if the movement continues to run, the same friction as mentioned above absorbs the rotation and spins in a vacuum. It is important to note that the discs must rotate in the same direction and on average at the same speed for this type of power reserve display.

It is possible to imagine the inverse kinematics, and reverse the behaviour of the friction, that is to say that the wheels remain stationary when the winding is complete and forced, and that they rotate together when the indication displays zero.

It is understood that the timepiece mechanism 200 includes at least two control geartrains 201, 202, which do not control the rotation of the wheels 1, 2 at the same time, but a single control geartrain 201, 202, controls, at a given time, the rotation of only one of the wheels 1, 2. In the example illustrated, the control geartrains 201 and 202 respectively include outputs 3 and 4 rotating in the opposite direction, which is not an obligation. The display of the power reserve is a useful complication for a mechanical watch, especially if this watch includes calendar complications, because it allows the user to avoid the tedious resetting of calendar data, especially in the case of annual or perpetual date.

Other applications can profitably use the invention, for example displaying the striking power reserve on a minute repeater watch, to signal to the user that it is prohibited to trigger another striking control that the striking in progress has not ended, if the watch is not equipped with adequate insulators to prohibit such operations; it is then possible, after viewing the coiling controlled by a bolt or the like, to view the progressive unloading of the striking barrel(s).

Another application relates to a particular display for a chronograph mechanism, with one of the wheels displaying the instantaneous elapsed time, and another wheel displaying the maximum (or respectively minimum) value measured on a set of counts related to the same event.

Yet another application relates to the display of altimetric values, for diving watches or else hiking watches: one of the wheels displays the instantaneous depth or height relative to a reference, and the other wheel displays the depth or the maximum altitude reached. The second geartrain is used to reset the altimetric indication.

Many other applications are possible, due to the simplicity and compactness of the mechanism according to the invention.

More particularly, the timepiece mechanism 200 is a watch movement including an upper part arranged to face the user, and the display device 100 is an additional sub-assembly which can be inserted on the movement on the side of the upper part, and which can be easily positioned and immobilised on a platen 40 or a holding plate 50 included in the movement, by at least one key 55 and/or an eccentric lock 81, 82, cooperating with a bore 51 and/or a bearing surface 52 included in the holding plate 50 or the platen 40. More particularly, this movement includes at least one cannon-pinion for driving a display, which at least one cannon-pinion is surrounded by the wheels 1, 2.

More particularly, the timepiece mechanism 200 includes at least one control means 300 that can be used by a user, such as a control rod or the like, to control a triggering of a first control geartrain 201, 202, and/or a reset, to control the reset of another control geartrain 202, 201.

The invention lends itself well to pre-assembly of the discs, to produce a removable sub-assembly that is easy to handle, for easy assembly and disassembly relative to a horological movement receiving and controlling this display device 100.

The use of bolts/eccentrics accessible from the dial side allows to lock this sub-assembly in the movement and allows disassembly of the aforementioned sub-assembly without any further handling force.

In addition to its interest in terms of space requirement and reasonable costs, thanks to the simplicity of the system, the use of components that are easy to produce, the production in the form of a removable sub-assembly, the invention also provides satisfactory responses in terms of resistance to shocks, ease of adjustment and control of swings; the wheels are axially and radially independent of the other dials and display elements, they are axially independent of each other, and their only cooperation is their radial dependence and their angular drive by each other.

Various fixing methods can be used, and variants wherein everything is adjusted and fixed from the upper side of the watch are advantageous, since they simplify initial assembly as well as the after-sales.

In a first variant, the first wheel 1 is annular and constitutes an intermediate dial, included in an upper surface 11 visible to the user, and which can be surrounded by a fixed outer dial 210 of the timepiece 1000; the second annular wheel 2 carries a central dial 26 whose upper surface 21 is visible to the user, this central dial 26 including feet 28, 280, cooperating with housings 29, 290, of the second wheel 2, and which can be blocked by eccentric keys operated during pre-assembly of the removable sub-assembly, which then includes the first wheel 1, the second wheel 2, the central dial 26, and the eccentric keys; the first wheel set 1 is advantageously enclosed axially between the second wheel 2 and the central dial 26: its axial movement is thus determined by construction, and strictly respected. This removable sub-assembly can easily be positioned on a platen 40, or on a holding plate 50 fixed to such a platen, included in the timepiece mechanism 200, in particular a movement, and be immobilised by several locks 81 or 82, in particular rotary locks 82 inside a clearance 820 included for example in the holding plate 50, which includes at least one stop boss 850 to limit the angular travel of a control arm included in the rotary lock 82, as visible in FIGS. 16 and 17 which illustrate the holding of a peripheral web 24 of the second wheel 2. Advantageously, a holding plate 50 is implemented, which surrounds the cannon-pinion in the case of a conventional mechanical movement, and which includes a bearing surface 57 cooperating at low clearance with a bore 27 included in the second wheel 2, or vice versa.

Figure 11:
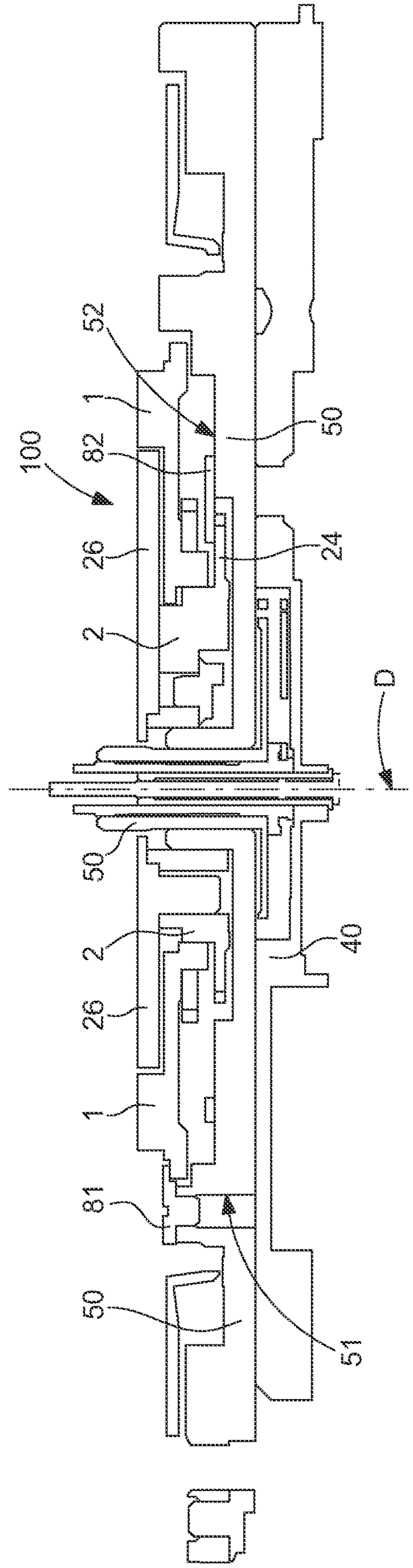
FIG. 11 shows, similarly to FIG. 7, the removable sub-assembly positioned and locked on the movement holding plate.
Figure 12:
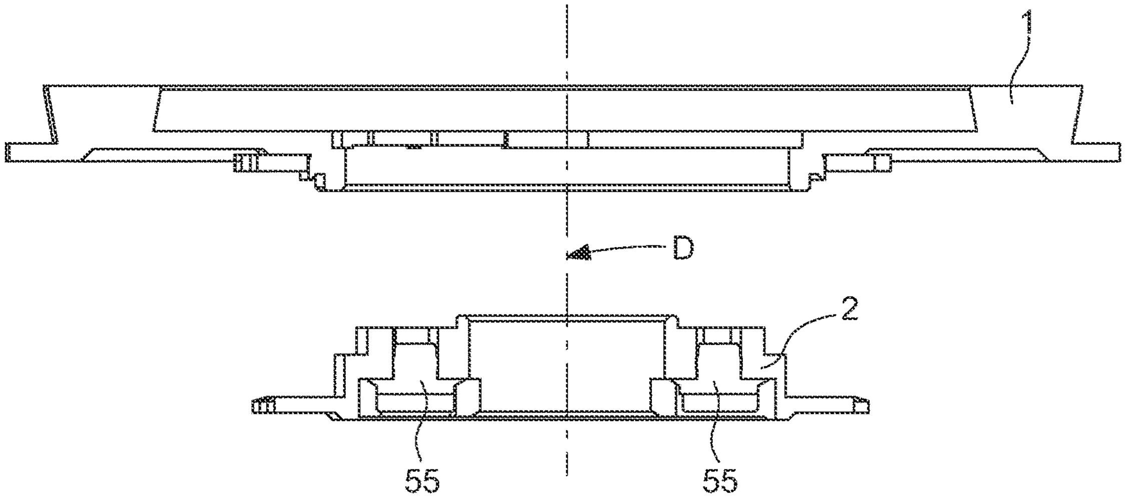
FIG. 12 shows these two wheels, schematically and in section passing through the axis common to the two wheels, before their assembly.
Figure 13:
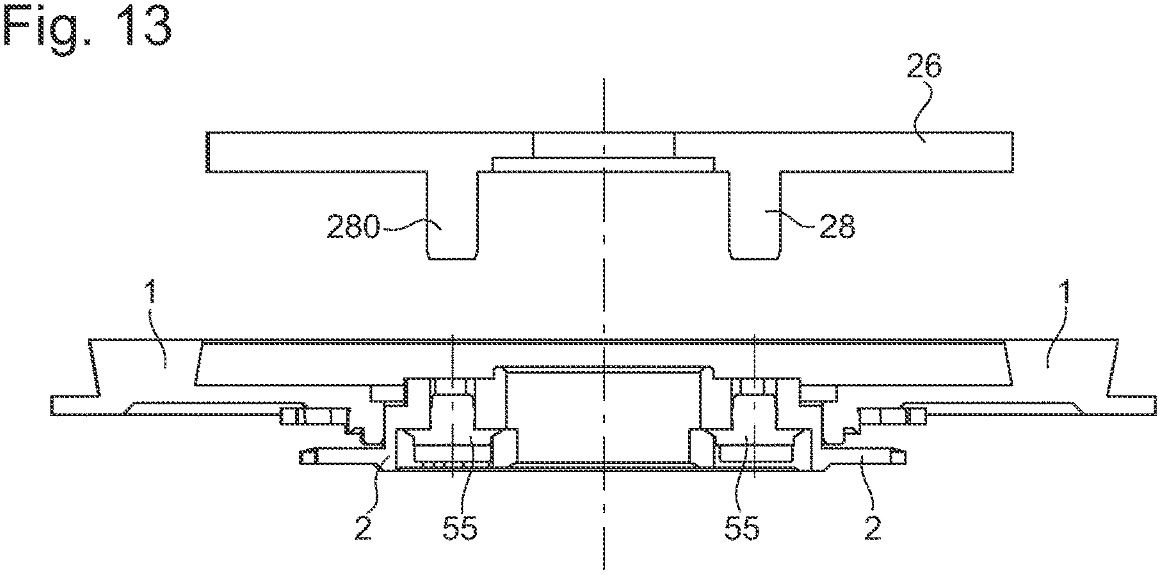
FIG. 13 shows, similarly to FIG. 12, these two wheels, after their assembly, and during the insertion of the central dial on the second wheel.
Figure 14:
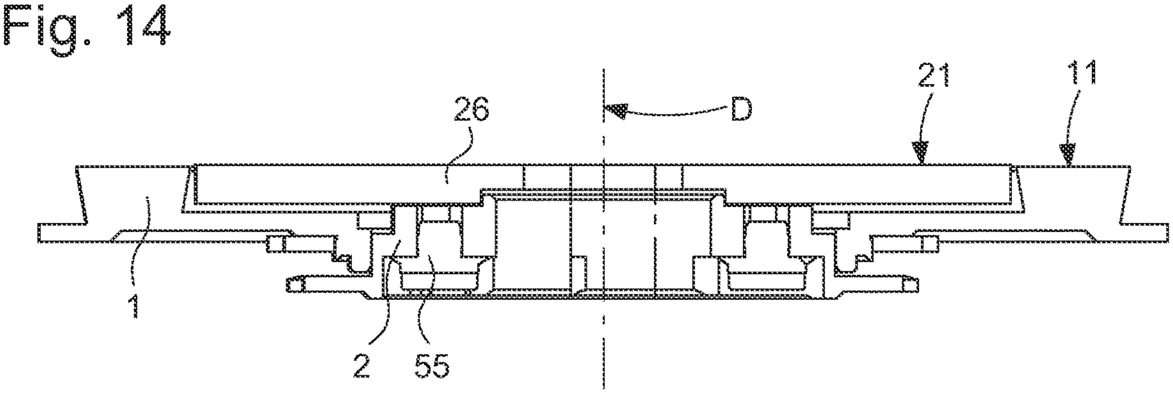
FIG. 14 shows, similarly to FIG. 13, the locking of the central dial on the second wheel.
Figure 15:
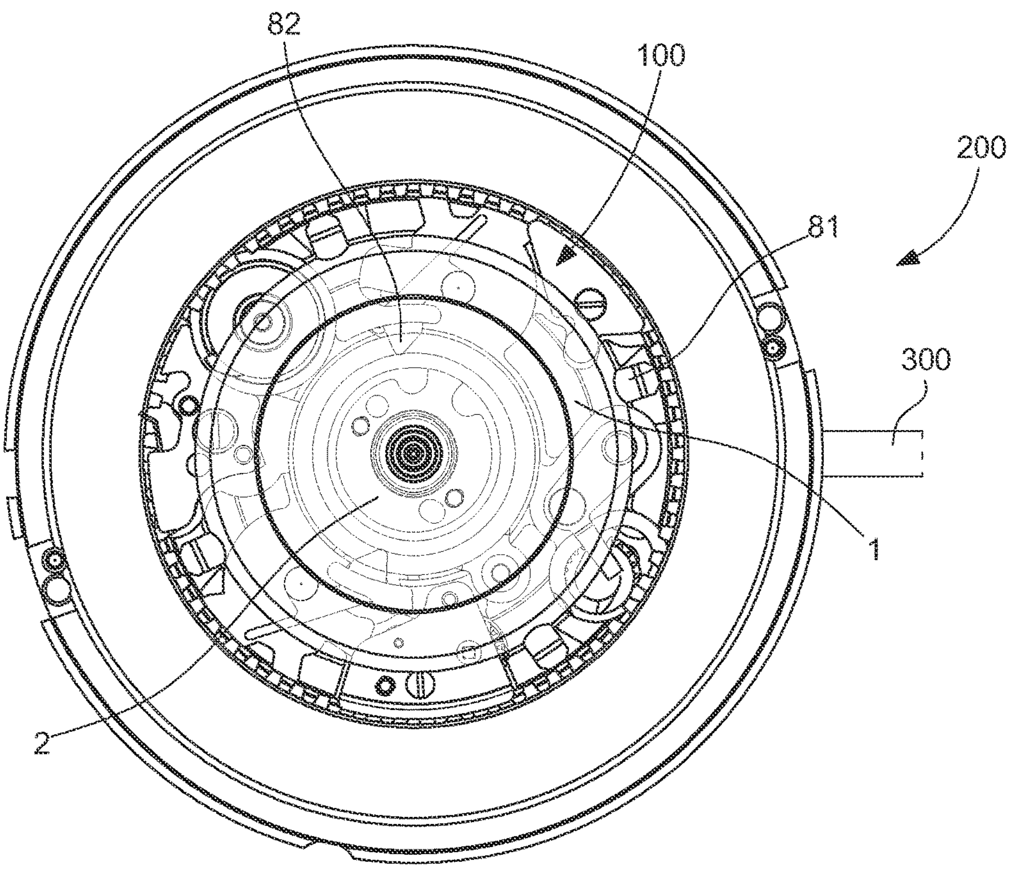
FIG. 15 shows, schematically and in plan, the watch with the removable sub-assembly positioned in the movement, the central dial not being shown; this figure shows the locks of the intermediate ring formed by the first wheel, and those of the central ring formed by the second wheel.
Figure 16:
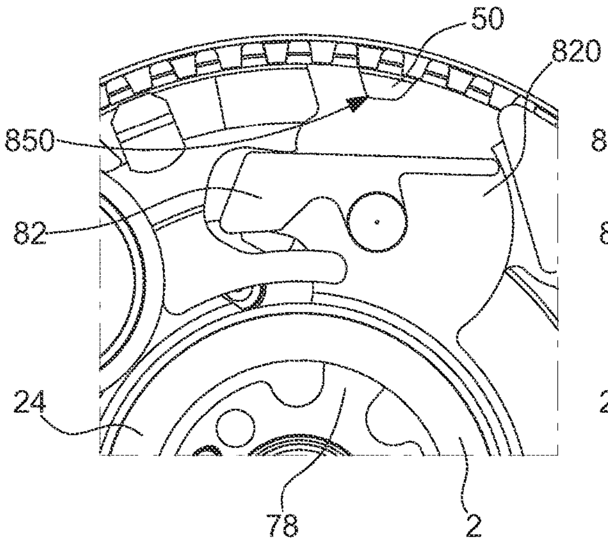
FIGS. 16 and 17 are details of the rotary locks visible in FIG. 15 for holding a lower web included in the second wheel, in the unlocked position in FIG. 16, and locked position in FIG. 17.
Figure 17:
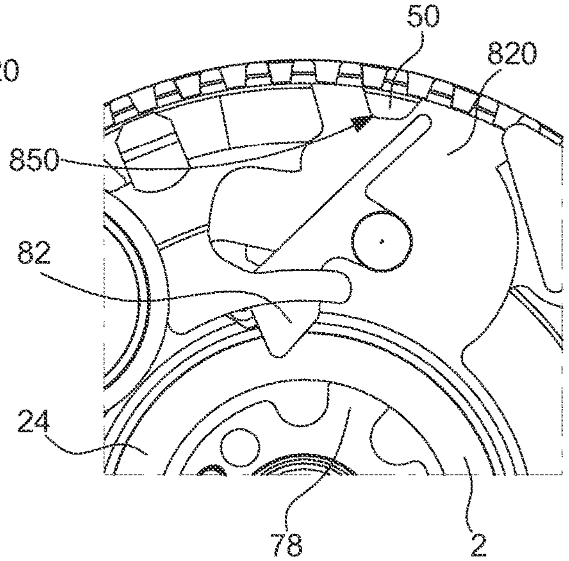
Figure 18:
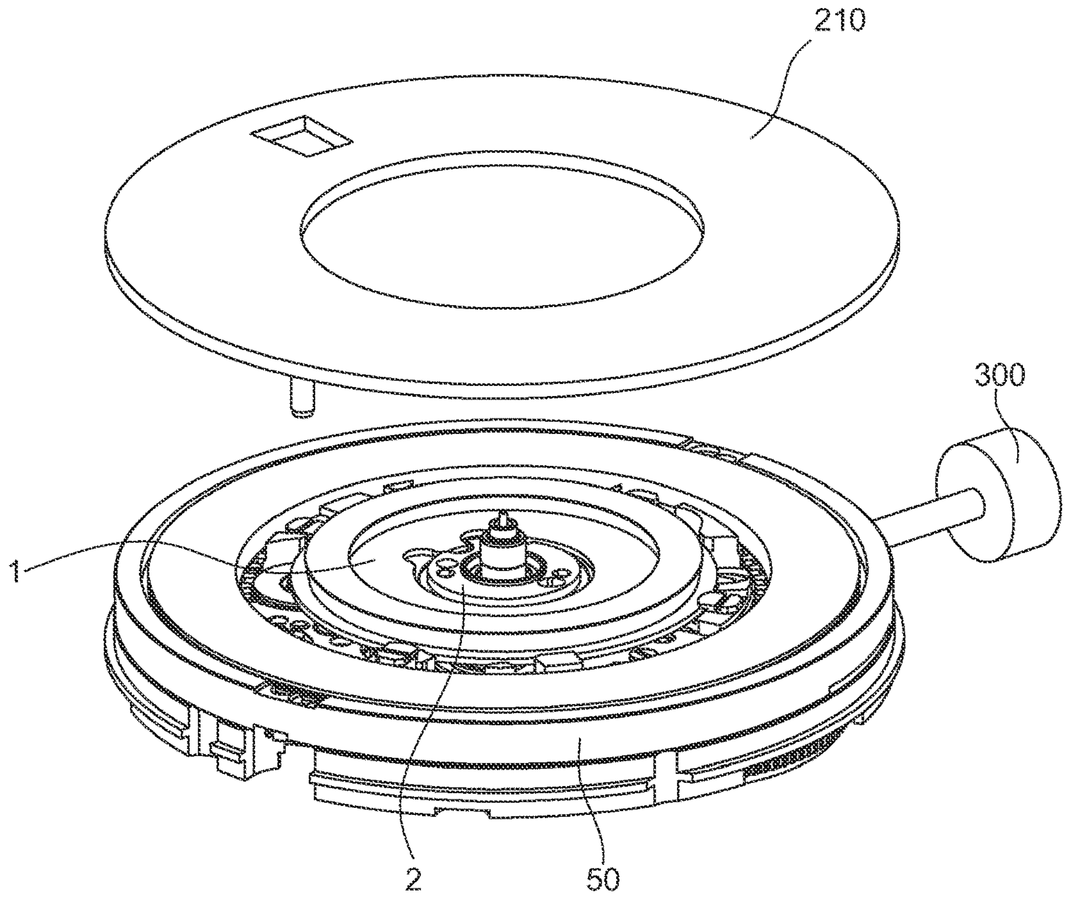
FIGS. 18 and 19 show, schematically and in perspective, the presentation then the assembly of an outer dial which surrounds the first wheel.
Figure 19:
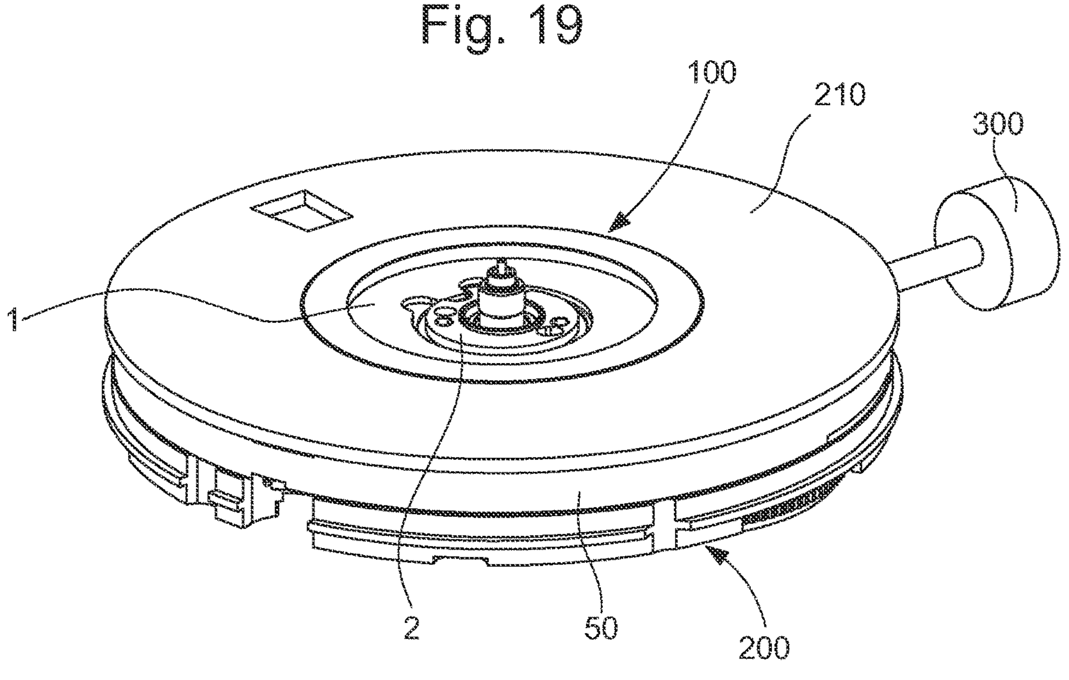
Figure 20:
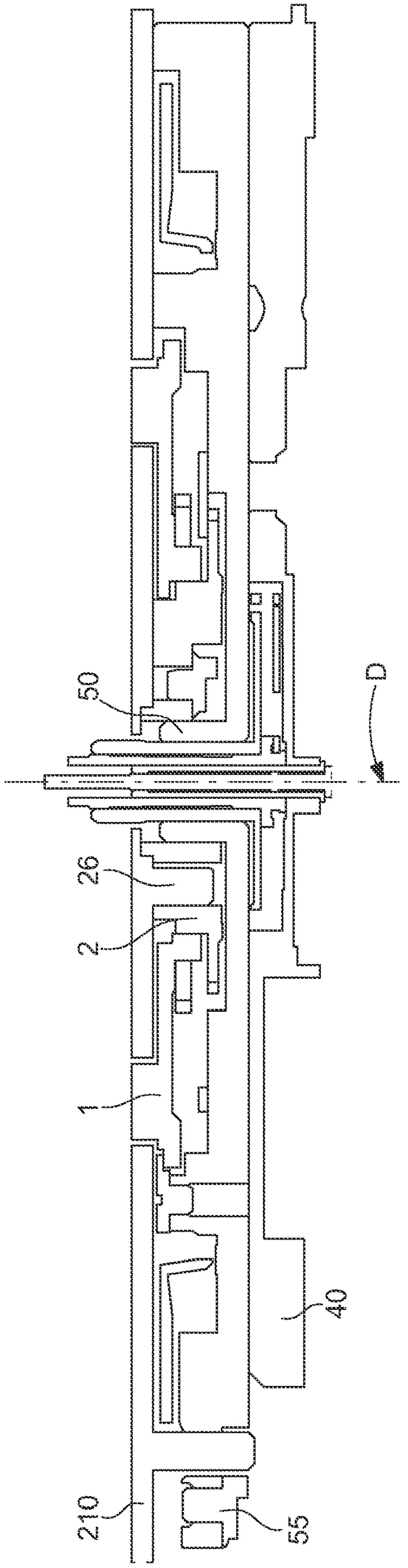
FIG. 20 shows, similarly to FIG. 18, the entire display device, with the locking of the outer dial.

A second variant is precisely that illustrated by FIGS. 16 and 17: the removable sub-assembly is pre-assembled in the same way, and the second wheel 2 includes a web 24 at its lower part, also visible in FIG. 11, which is thus locked by at least two rotary locks 82. If the timepiece 1000 includes an outer dial around the first annular wheel 1, it is easy to maintain this outer dial on the holding plate 50 by at least two keys accessible from its periphery.

In a third variant, that can be combined with the previous ones, the first wheel 1 is still immobilised or at least axially limited by keys 81 or locks engaged with the holding plate 50, as shown in FIG. 11.

In any case, the assembly sequence is very simple, because it does not require any reversal of the timepiece mechanism 200: everything is done from a single side. In the particular, non-limiting example illustrated by the figures, the removable sub-assembly is pre-assembled by engaging the first wheel 1 and the second wheel 2, the central dial 26 is attached, positioned by its feet, which are stopped by keys, in particular jaw keys, this sub-assembly is positioned on the holding plate 50, on which it is locked: the functional shakes and the divisions are ensured, the positions are correct, and the locking is effective against shocks.

The invention claimed is:

1. A timepiece (1000) comprising:

a timepiece mechanism (200); and a display device (100) for displaying at least one magnitude relating to said timepiece mechanism (200), said display being produced in combination on a plurality of wheels (1; 2) arranged to be driven in rotational movements in a same direction of rotation by at least one output (3; 4) included in said timepiece mechanism (200), at least a said wheel (1; 2) being integral in rotation with an indicator (60; 61; 62) so as to display a representation of said magnitude by an angular difference between said indicators (60; 61; 62) or between a said indicator (60; 61; 62) and a fixed scale, wherein said timepiece mechanism (200) is arranged to drive, at a given time, only one of said wheels (1; 2) by a single said output (3; 4), wherein said display device (100) includes internal means for driving said wheel (1; 2) by another said wheel (2; 1), and said display device (100) and/or said timepiece mechanism (200) includes means for disengagement in at least one end-of-travel position of said wheel (1; 2), and wherein at least one of:

a first said wheel (1) is an outer ring which includes, on the inside, an inner area of revolution (58) which is interrupted by an inner projection (56) including at least a first lateral stop surface (5; 6) and which includes an inner radial end (560) closer to the common axis than said inner area of revolution (58), and a second, said wheel (2) is an inner ring or a disc which includes, on the outside, an outer area of revolution (76) which is interrupted by an outer projection (78) including at least a lateral stop surface (7; 8) and which includes an outer radial end (780) farther from the common axis than said outer area of revolution (76) and than the inner radial end (560), to allow relative drive between said inner projection (56) and said outer projection (78) by abutting with each other.

2. The timepiece (1000) according to claim 1, wherein said timepiece mechanism (200) includes means for disengagement in each end-of-travel position of said wheel (1; 2).

3. The timepiece (1000) according to claim 1, wherein the internal drive means are formed by stop surfaces (5; 6) of a said wheel (1; 2) which are arranged to cooperate with complementary stop surfaces (7; 8) included in another said wheel (2; 1).

4. The timepiece (1000) according to claim 1, wherein said timepiece mechanism (200) includes means for disengagement in each end-of-travel position of said wheel (1; 2) and wherein the internal drive means are formed by stop surfaces (5; 6) of a said wheel (1; 2) which are arranged to cooperate with complementary stop surfaces (7; 8) included in another said wheel (2; 1).

5. The timepiece (1000) according to claim 1, wherein said disengagement means include friction means (9) incorporated in a control geartrain (201; 202) included in said timepiece mechanism (200).

6. The timepiece (1000) according to claim 1, wherein said wheels (1; 2) are coaxial.

7. The timepiece (1000) according to claim 1, wherein said mechanism (200) is arranged to drive each said wheel (1; 2) substantially at the same angular speed.

8. The timepiece (1000) according to claim 1, wherein at least one of said wheels (1; 2) is a ring surrounding the other of said wheels (2; 1) which is a ring or a disc.

9. The timepiece (1000) according to claim 3, wherein both:

the first said wheel (1) is the outer ring which includes, on the inside, the inner area of revolution (58) which is interrupted by the inner projection (56) including at least the first lateral stop surface (5; 6) and which includes the inner radial end (560) closer to the common axis than said inner area of revolution (58), and the second, said wheel (2) is the inner ring or the disc which includes, on the outside, the outer area of revolution (76) which is interrupted by the outer projection (78) including at least the lateral stop surface (7; 8) and which includes the outer radial end (780) farther from the common axis than said outer area of revolution (76) and than the inner radial end (560), to allow relative drive between said inner projection (56) and said outer projection (78) by abutting with each other.

10. The timepiece (1000) according to claim 3, wherein said wheels (1; 2) are coaxial and at least one of said wheels (1; 2) is a ring surrounding the other of said wheels (2; 1) which is a ring or a disc.

11. The timepiece (1000) according to claim 9, wherein said outer radial end (780) fits within a smaller diameter than that of said inner area of revolution (58), and wherein said inner radial end (560) extends radially beyond a diameter equal to that of said outer area of revolution (76).

12. The timepiece (1000) according to claim 9, wherein said second wheel (2) is an inner ring arranged to carry a central dial (26).

13. The timepiece (1000) according to claim 12, wherein said central dial (26) is indexed by asymmetrical feet (28, 280).

14. The timepiece (1000) according to claim 1, wherein at least one of said wheels (1; 2) carries an indicator (60) which is movable facing a scale defining a minimum magnitude (61) and a maximum magnitude (62), said scale being carried by another said wheel (2; 1) or by a platen (40) or a holding plate (50) included in said timepiece mechanism (200).

15. The timepiece (1000) according to claim 1, wherein said display device (100) is a power reserve display device for displaying the energy level of an energy source including a barrel (30) or a set of barrels (30) mounted in series and included in said timepiece mechanism (200), which includes a load geartrain (201) driven by a coiling shaft (301) included in said barrel (30) or said set of barrels (30), which load geartrain (201) drives a coiling indicator (1) constituting one of said wheels (1; 2), and an unload geartrain (202) driven by a cover (310) or a drum included in said barrel (30) directly upstream of said display mechanism (100), which unload geartrain (202) drives an uncoiling indicator (2) constituting another of said wheels (1; 2).

16. The timepiece (1000) according to claim 15, wherein said disengagement means include friction means (9) incorporated in a control geartrain (201; 202) included in said timepiece mechanism (200) and wherein said friction means (9) are inserted between said coiling shaft (301) and said coiling indicator (1), or/and between said cover (310) or drum and said uncoiling indicator (2).

17. The timepiece (1000) according to claim 1, wherein said timepiece mechanism (200) is a watch movement including an upper part arranged to face the user, and wherein said display device (100) is an additional sub-assembly which can be inserted on said movement on the side of said upper part and which can be immobilised on a platen (40) or a holding plate (50) included in said movement by at least one key (55) or/and an eccentric lock (81, 82).

18. The timepiece (1000) according to claim 17, wherein said watch movement includes at least one cannon-pinion for driving a display, which at least one cannon-pinion is surrounded by said wheels (1; 2).

19. The timepiece (1000) according to claim 1, wherein said disengagement means include friction means (9) incorporated in a control geartrain (201; 202) included in said timepiece mechanism (200) and wherein said timepiece mechanism (200) includes at least one control means (300) that can be used by a user to control a triggering of a first control geartrain (201; 202) and/or a reset, to control the reset of another control geartrain (202; 201).

20. A timepiece (1000) comprising:

a timepiece mechanism (200); and a display device (100) for displaying at least one magnitude relating to said timepiece mechanism (200), said display being produced in combination on a plurality of wheels (1; 2) arranged to be driven in rotational movements in a same direction of rotation by at least one output (3; 4) included in said timepiece mechanism (200), at least a said wheel (1; 2) being integral in rotation with an indicator (60; 61; 62) so as to display a representation of said magnitude by an angular difference between said indicators (60; 61; 62) or between a said indicator (60; 61; 62) and a fixed scale, wherein said timepiece mechanism (200) is arranged to drive, at a given time, only one of said wheels (1; 2) by a single said output (3; 4), wherein said display device (100) includes internal means for driving said wheel (1; 2) by another said wheel (2; 1), and said display device (100) and/or said timepiece mechanism (200) includes means for disengagement in at least one end-of-travel position of said wheel (1; 2), and wherein said display device (100) is a power reserve display device for displaying the energy level of an energy source including a barrel (30) or a set of barrels (30) mounted in series and included in said timepiece mechanism (200), which includes a load geartrain (201) driven by a coiling shaft (301) included in said barrel (30) or said set of barrels (30), which load geartrain (201) drives a coiling indicator (1) constituting one of said wheels (1; 2), and an unload geartrain (202) driven by a cover (310) or a drum included in said barrel (30) directly upstream of said display mechanism (100), which unload geartrain (202) drives an uncoiling indicator (2) constituting another of said wheels (1; 2).

* * * * *